United States Patent [19]

Schmid et al.

[11] Patent Number: 4,677,885
[45] Date of Patent: Jul. 7, 1987

[54] FACE DRIVER FOR CENTERING AND DRIVING WORKPIECES CHUCKED IN A LATHE

[75] Inventors: Herbert Schmid, Renningen; Karl Hiestand, Pfullendorf, both of Fed. Rep. of Germany

[73] Assignees: Sandvik Kosta GmbH; SMW Schneider & Weisshaupt GmbH, of DEX

[21] Appl. No.: 863,611

[22] Filed: May 15, 1986

[30] Foreign Application Priority Data

May 15, 1985 [DE] Fed. Rep. of Germany ....... 3517633

[51] Int. Cl.⁴ .............................................. B23B 33/00
[52] U.S. Cl. .................................... 82/40 R; 279/1 Q
[58] Field of Search ........................ 82/40 R; 279/1 Q

[56] References Cited

U.S. PATENT DOCUMENTS 2,897,708 8/1959 Kostyrka ........................... 82/40 R
4,604,923 8/1986 Link et al. .......................... 82/40 R

FOREIGN PATENT DOCUMENTS 2741777 3/1979 Fed. Rep. of Germany ..... 82/40 R

Primary Examiner—Nicholas P. Godici
Assistant Examiner—Jerry Kearns
Attorney, Agent, or Firm—McGlew & Tuttle

[57] ABSTRACT

A face driver for centering and driving a workpiece to be chucked in a lathe comprises a support provided with a dead center member and several driving pins around the dead center member so as to be movable and pressable against the workpiece by a compression member acting against a pressure plate, the pressure plate is retained so as to be floating in the axial directions of the support, and it has parts or arms associated with the driving pins which are elastically deformable. This causes squareness errors of the workpiece to be chucked to be compensated for automatically at low structural cost.

15 Claims, 8 Drawing Figures

FACE DRIVER FOR CENTERING AND DRIVING WORKPIECES CHUCKED IN A LATHE

FIELD AND BACKGROUND OF THE INVENTION

This invention relates in general to workpiece holding devices and in particular to a new and useful face driver for centering and driving workpieces to be chucked in a lathe.

The invention relates to a face driver for centering and driving workpieces chucked in a lathe, with a support which is connected to the lathe and supports a dead center and in which are inserted several driving pins which are uniformly distributed over the circumference and can be pressed against the workpiece to be chucked by means of a pressure plate acted upon centrally by a compression member.

A similar face driver is known from German OS No. 34 00 082. In this embodiment, the pressure plate is designed as a rigid component and clamped between a piston rod of an actuating piston disposed in a hydraulic cylinder and the driving pins. Since the piston rod end in contact with the pressure plate is convex and a return spring supported by the support and each driving pin is assigned to each driving pin, the pressure plate can assume an oblique position if the support is equipped with only two or three driving bolts so that the squareness errors of the workpiece must be compensated for accordingly, although this is not the purpose of this known face driver. In face drivers equipped with more than three driving pins, however, compensating squareness differences in the workpiece to be chucked is not possible in this manner.

Furthermore, no guidance and, hence, no defined position of the pressure plate is provided for, for which reason it can easily change its position during the return stroke of the actuating piston. Also, when chucking a workpiece, the force of the return springs must be overcome, which reduces the chucking force.

SUMMARY OF THE INVENTION

Accordingly, the invention provides an improved face driver which, regardless of the number of driving pins installed in the support, compensates for squareness tolerances of the workpiece to be chucked automatically. The structural cost required to do this should be kept low, and yet there should be assurance that the chucking force introduced via the compression member is transferable to the workpiece without chucking force reduction and that the workpiece can always be chucked reliably.

According to the invention, the pressure plate is retained in axial directions of the support so as to be floating and the pressure plate components associated with the driving pins are elastically deformable.

It is advisable in this connection to insert the pressure plate in a cylindrical cutout in the support, making its outside diameter convex and thus support it on the cylindrical inside diameter of the cutout so as to be floating. But the pressure plate can also be connected additionally to the compression member centrally via a ball joint, the ball joint including a ball head formed on the compression member and a hemispherical recess machined into the pressure plate to retain the ball head.

The elasticlly deformable parts of the pressure plate may be formed in simple embodiment by arms radially projecting outwardly from a hub, but it is also possible to design these parts as segments which are elastic in axial direction in that radially oriented slots or cutouts are machined into the pressure plate between the driving pin contact surfaces.

According to a different embodiment, the elastically deformable parts of the pressure plate may also be formed by an insert of hydroplastic material inserted into the pressure plate, which insert is to be installed in recesses machined into the face of the pressure plate in the areas assigned to the various driving pins, or in a circular recess machined into the pressure plate side facing the driving pins, which recesses are sealed by means of a cover plate and balls or bolts retained therein as intermediate links.

It is expedient furthermore to provide the pressure plate and/or the driving pins with convex contact surfaces.

The driving pins may also be supported by the elastically deformable parts of the pressure plate via an intermediate link each. The intermediate links should each be designed as a ball or as bolt with a ball head formed at its end.

It is further of advantage to provide the pressure plate with elastically deformable parts which are disposd in two planes axially one behind the other and are mutually staggered, and to equip the driving pins with an elastically deformable intermediate part each inserted in it.

If driving pins ae installed in the support on different diameters it is advisable to support them via a compensating element and a spherical intermediate link on the common pressure plate.

The face driver designed in accordance with the invention makes it possible to compensate in simple manner automatically even bigger squareness tolerances of a workpiece which result automatically e.g. when sawing it off, this being independent of the number of driving pins installed in a support. For, if the pressure plate is floating and the parts associated with its driving pins are elastically deformable, then each driving pin can carry out a compensating motion if needed. Even workpieces with uneven or oblique faces can be chucked reliably with the face driver designed in accordance with the invention without having to premachine them.

The structural cost required to make this possible is extremely low because only the pressure plate has to be dsigned accordingly. Furthermore, there is no chucking force loss, there rather is an increase in chucking force when workpieces are involved in which squareness errors must be compensated because the respective driving pins performing a compensating motion are pressed against the workpiece additionally with the preloading force of the elstically deformable part of the pressure plate. This makes for a many-sided, advantageous applicability of the face driver according to the invention.

Accordingly it is an object of the invention to provide an improved device for centering and driving a workpiece to be chucked in a lathe which includes a support member having axially extending holes around a dead center member for the sliding movement of individual driving pins having one end which bears against the workpiece and opposite ends which are engaged by a pressure member which is urged toward the workpiece by a pressure ember engaging the pressure member from its opposite side.

A further object of the invention is to provide a face driver for centering and driving workpieces which is simple in design, rugged in construction and economical to manufacture.

The various features of novelty which characterize the invention are pointed out with particularity in the claims annexed to and forming a part of this disclosure. For a better understanding of the invention, its operating advantages and specific object attained by its uses, reference is made to the accompanying drawings and descriptive matter in which preferred embodiments of the invention are illustrated.

DESCRIPTION OF THE PREFERRED EMBODIMENTS

Figure 1:
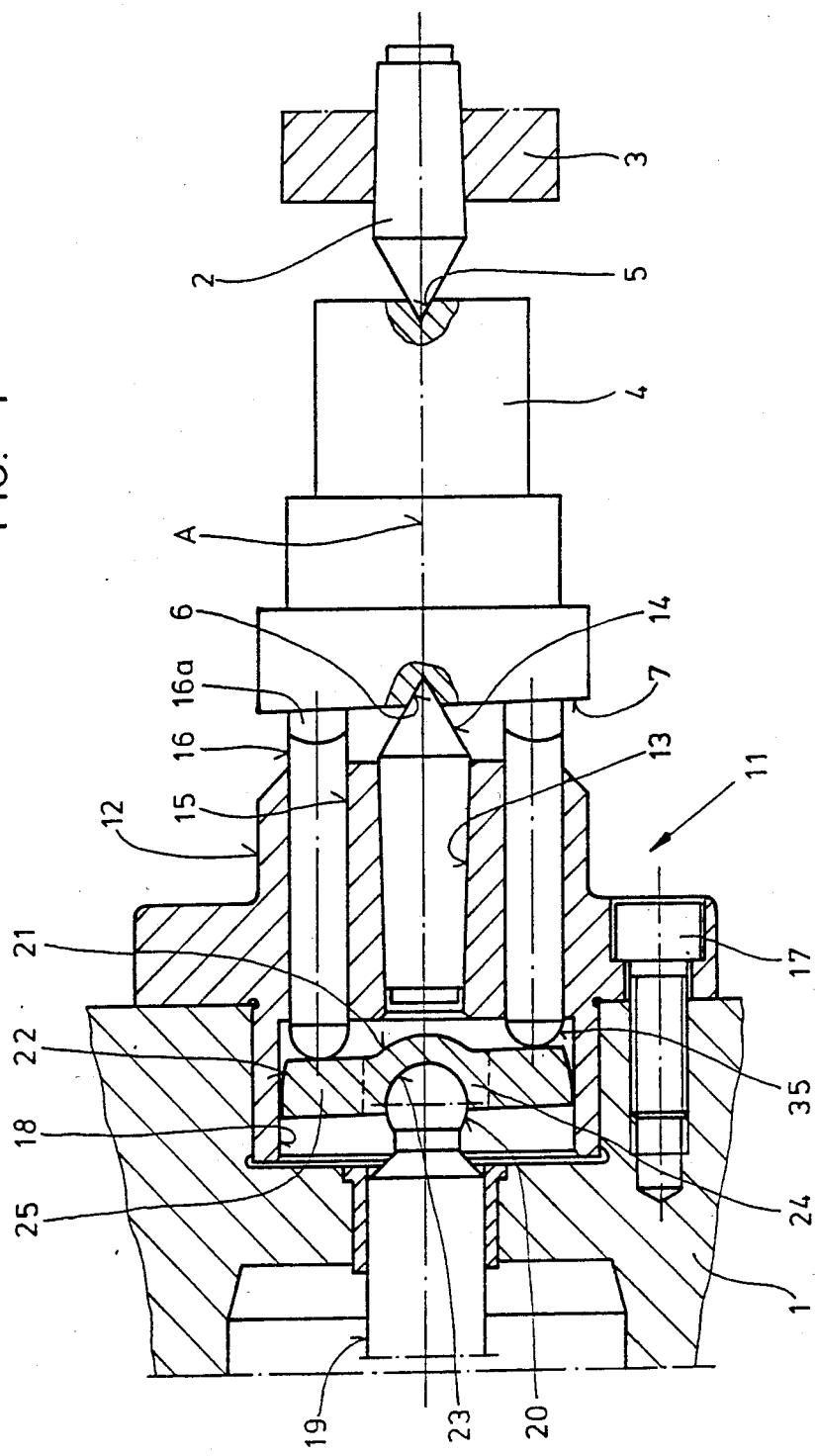
FIG. 1 is an axial sectional view of a face driver disposed in a lathe with a chucked workpiece and consructed in accordance with the invention.

Referring to the drawings in particular, the invention embodied therein comprises a face driver 11 for centering and driving a workpiece 4 to be chucked in a lathe 1. Face driver 11 comprises a support 12 having one end with a dead center 14 adapted to engage against the workpiece 4 and has a plurality of axially extending recesses or holes 15 around the dead center 14 which driving pin 16 are movable. Driving pin 16 have first ends 16a with cutting edges and are adapted to press against the workpiece and they have opposite second ends which in the embodiment shown are rounded at 35 which bear against a pressure plate 21. Pressure plate 21 is floatably arranged within a recess 18 of the support 12 and it has elástic portions such as the arms 25 in the embodiment of FIG. 2 which are in engagement with respective second ends of the pin 16 which are elastically deformable. In accordance with the invention a compression member 19 engaged against the opposite side of the pressure plate 21 urges the plate and the driving pin 16 toward the workpiece 4.

The face driver shown in FIG. 1 and designated 11 serves for the centering and positive chucking between centers of a workpiece 4 in a lathe 1 and comprises a support 12 screwed to the lathe by means of screws 17, a dead center 14 inserted in a central, tapered hole 13 and supported by the support 12, as well as several driving pins 16 which are uniformly distributed over the circumference and retained in axially elongated bores or holes 15 so as to be movable axially therein. In addition a pressure plate 21 is disposed in a hollow cylindrical recess or cutout 18 of the of the support 12. The pressure plate 21 is acted upon centrally by a compression member 19, e.g. the piston rod of a piston acted upon by a pressure medium so that the cutting edges 16a of the driving pins 16 are pressable against the face 7 of the workpiece 4. The workpiece 4, provided with centering holes 5 and 6, is rotatably held by a center 2 inserted in a bearing box 3 as counter bearing and is taken along by the face driver 11 when the latter rotates so that machining of the workpiece 4 over its entire axial length is possible in one operation.

In the face driver 11, the pressure plate is retained so as to be floating in axial directions A of the lathe 1. To accomplish this, the end of the compression member 19 is designed as ball head 20, and a hemispherical recess 23 accommodating the ball head 20 is machined into the pressure plate 21 so that a ball joint is formed. Furthermore, the outside convexly shaped diameter 22 of the pressure plate 21 can float about the center of the ball head 20 and against the wall of cutout 18.

In addition, the pressure plate 21 is designed to be elastically deformable in the parts associated with the driving pins 16. In the embodiment example according to FIGS. 1 and 2, there are, in order to accomplish this, formed on a hub 24 arms 25 which project radially outward and with which a convex surface 35 of the driving pins 16 make contact. The driving pins 16 can thus carry out axial motions independent of each other so that, since the arms 25 of the pressure plate 21 can yield squareness errors of the workpiece 4 can be compensated for automatically in this manner without impairing its chucking. The pressure plate 21 is guided centrally (by member 19) and in its outer region, for which reason canting is impossible. Nor is the contact of the driving pins 16 with the arms 25 impaired when the arms perform pivoting motions because the driving pins 16 have a convex contact surface 35; pivoting motions are equalized also.

If the face 7 of the workpiece is uneven or is not perpendicular to the axis, the individual driving pins 16 are pushed back accordingly independently of each other because the arms 25 of the pressure plate 21 are elastically deformable and thus can yield. Squareness errors of the workpiece 4 are thereby compensated for without the need to machine the face 7.

Figure 2:
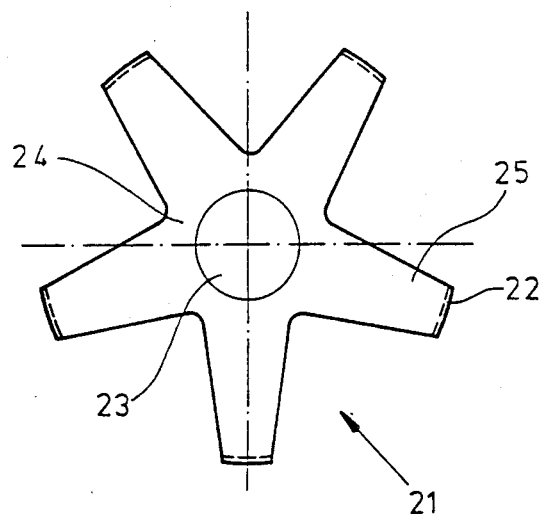
FIG. 2 is a front elevational view of the pressure plate provided in the face driver of FIG. 1.
Figure 3:
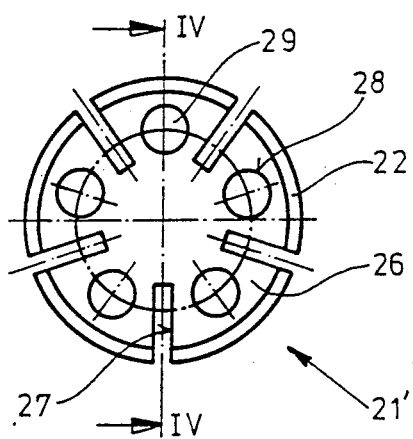
FIG. 3 is a view similar to FIG. 2 of a different embodiment of a pressure plate usable in the face driver of FIG. 1.
Figure 4:
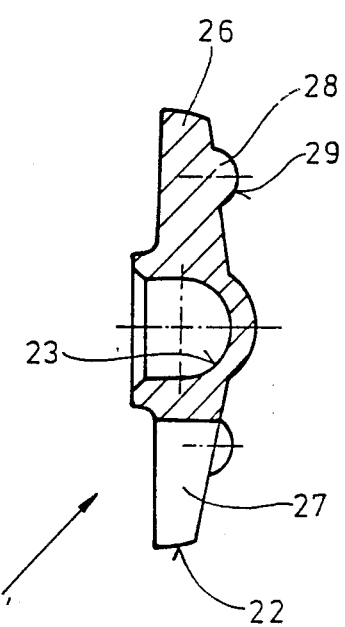
FIG. 4 is a section along line IV–IV of FIG. 3 of the pressure plate of FIG. 3.

In the pressure plate 21' shown in FIGS. 3 and 4 elastically deformable segments or arms 26 are provided which interact with the driving pins 16. The segments 26, elastic in axial direction A, are created by radially oriented slots 27 machined into the pressure plate 21', between the contact surfaces 29 of the driving pins 16. Furthermore, convex cams 28 forming arched contact surfaces 29 are formed on the pressure plate 21'. It is noted that in FIG. 2 arms 25 can also be considered to be segments with slots therebetwen.

Figure 5:
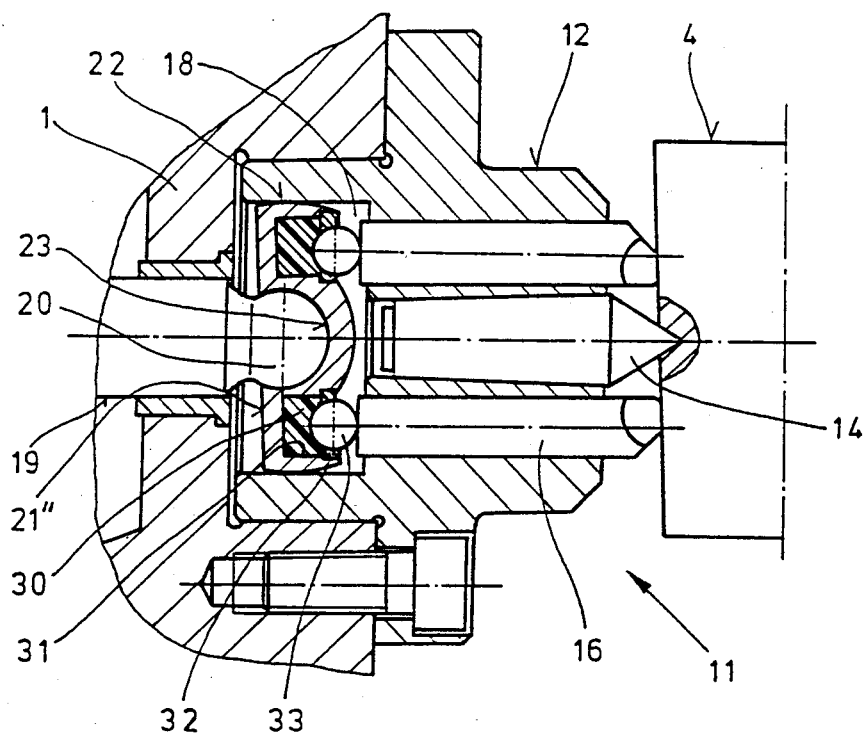
FIGS. 5 to 8 are axial sectional views of different embodiments of the face driver.

In the embodiment example according to FIG. 5, recesses 31 are machined into the pressure plate 21" in accordance with the arrangement of the driving pins 16, which recesses are filled with an insert 30 of hydroplastic material as elastically deformable parts of the pressure plate 21". The recesses 31 are sealed by means of a cover plate 32 and a ball 33 retained therein as intermediate links.

Figure 6:
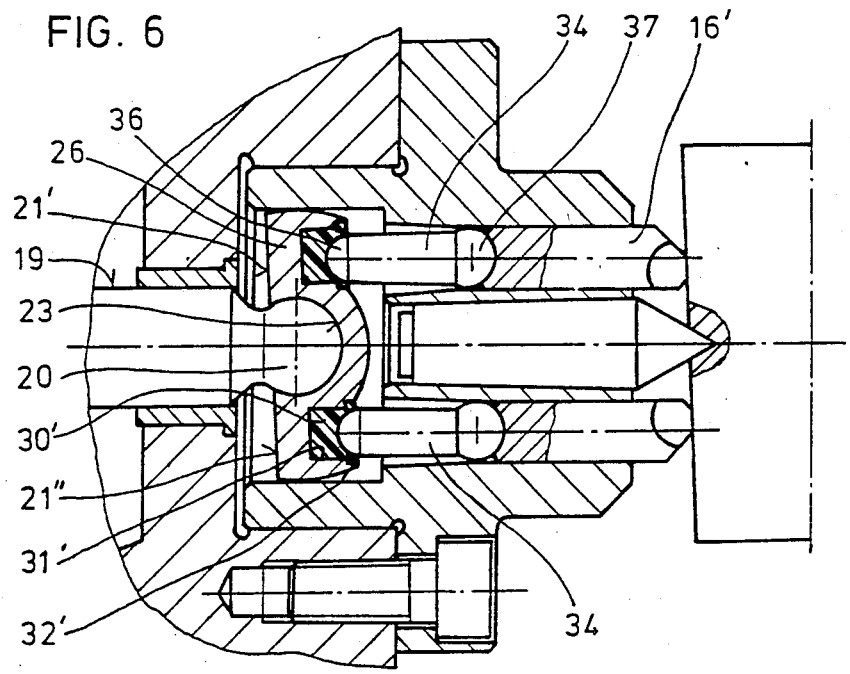

According to FIG. 6, bolts 34 whose ball heads 36 or 37 rest against the pressure plate 21' provided with segments 26 or against the prssure plate 21" equipped with an insert 30' of hydroplastic material and against the driving pins 16' are provided as intermediate links. The insert 30' is here installed in a circular recess 31' closed by an annular plate 32' and the bolts 34.

Figure 7:
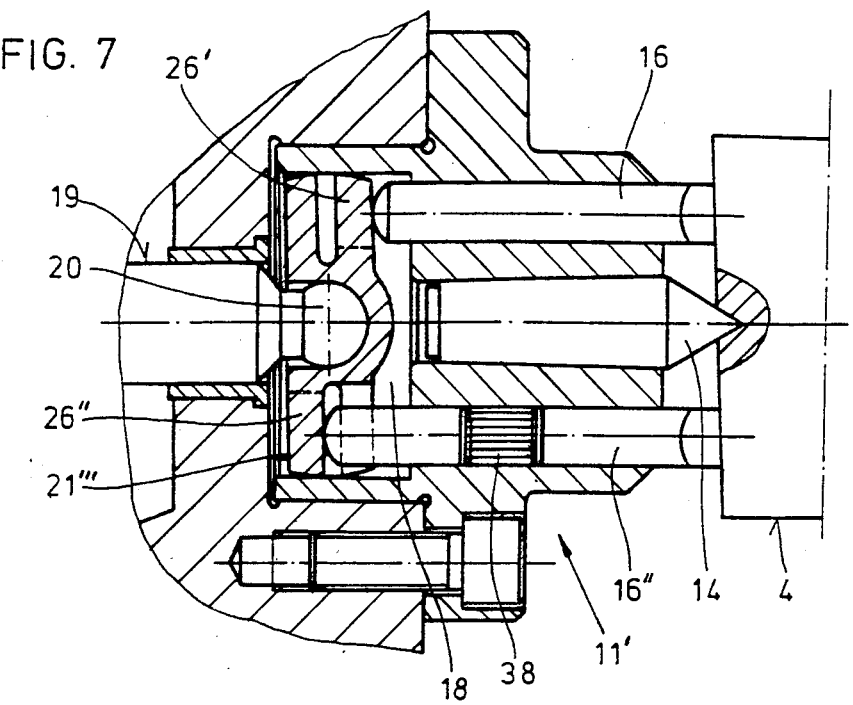

The face driver 11' according to FIG. 7 is equipped with a pressure plate 21''' which is provided with elastically deformable, mutually staggered segments 26' and 26" disposed in two planes axially one behind the other. This makes it possible to use large-sized segments 26', 26" or a multiplicity of driving pins 16, 16' can be provided. Inserted in the driving pins 16" is here one each intermediate part 38 as energy store in order to be able to maintain the contact pressure in case the chucking force drops.

Figure 8:
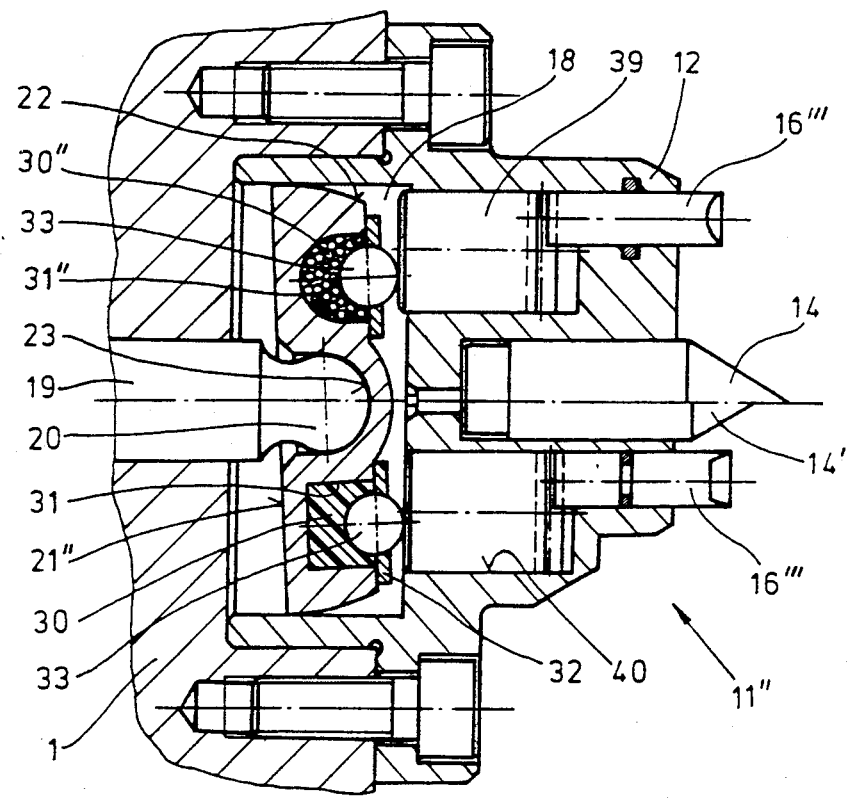

In the face driver 11" according to FIG. 8, the driving pins 16''' are arranged on different diameters so that different dead centers 14 and 14' can be used and different diameter workpieces can be chucked also. However, in order to be able to press all driving pins 16''' against the workpiece to be chucked by means of one pressure plate 21" common to all of them, equalizing elements 39 are installed in holes 40 of the support 12 and acted upon by the balls 33 retained in the cover plate 32. Again provided as elastically deformable parts of the pressure plate 21" is an insert 30 or 30" of hydroplastic material which is inserted in the differently shaped recesses 31 or 31".

Each embodiment disclosed above utilizes a pressure plate which includes recess means which renders engagement portions of the pressure plate which are engaged respectively with the driving pins, elastically deformable. In the embodiment of FIGS. 2 and 3 for example, the recess means are in the form of slots or spaces between the arms or segments 25 or 26. For the For the embodiments such as FIGS. 5, 6 and 8, the recess means are in the form of recess 31, 31' or 31" which contain hydroplastic material.

While specific embodiments of the invention have been shown and described in detail to illustrate the application of the principles of the invention, it will be understood that the invention may be embodied otherwise without departing from such principles.

What is claimed is:

1. A face driver for centering and driving a workpiece to be chucked in a lathe, comprising a support having one end with a dead center adapted to engage against the workpiece and having at least four axially circumferentially spaced recesses around the dead center, a driving pin movable in each of the recesses and having first ends adapted to press against the workpiece and opposite second ends, said support having an opposite end with a cylindrical recess, a pressure plate floatably retained within the recess and having one side with engagement portions in engagement with respective second ends of said pins, recess means for each engagement portion of said pressure plate which renders each engagement portion independently elastically deformable, said pressure plate having an opposite side, and a compression member engaged against the opposite side of said pressure plate urging said plate and said driving pins toward the workpiece, so that each independently elastically deformable engagement portion independently and elastically urges its driving pin toward the workpiece.

2. A face driver according to claim 1, wherein said support has a cylindrical cutout portion in which said pressure plate is positioned, said pressure plate having a side with a diameter which is convex and is dimensioned to be supported by its convex diameter against the wall of said support, so as to float.

3. A face driver according to claim 2, wherein said pressure plate is centrally connected to said compression member by a ball and socket joint.

4. A face driver according to claim 3, wherein said ball joint includes a ball head formed on said compression member, said pressure plate having a hemispherical recess and retaining said ball head.

5. A face driver according to claim 1, wherein one of said pressure plate and said driving pins are provided with convex contact surfaces.

6. A face driver according to claim 1, wherein said driving pins are provided with an elastically deformable intermediate part.

7. A face driver according to claim 1, wherein said pressure plate comprises a plurality of radially extending segments forming said engagement portions having slots between said segments forming said recess means, each segment being associated with a respective driving pin.

8. A face driver for centering and driving a workpiece to be chucked in a lathe, comprising a support having one end with a dead center adapted to engage against the workpiece and having a plurality of axially extending recesses and having first ends adapted to press against the workpiece and opposite second ends, said support having an opposite end with a cylindrical recess, a pressure plate floatably retained within the recess and having one side with portions in engagement with respective second ends of said pins, and which are elastically deformable and having an opposite side, and a compression member engaged against the opposite side of said pressure plate urging said plate and said driving pins toward the workpiece, said pressure plate includes elastically deformable portion formed by an insert of hydroplastic material.

9. A face driver according to claim 8, wherein said pressure plate has machined recesses therein carrying said insert located in alignment with said pins, each being sealed by a ball held in a cover plate, said ball comprising an intermediate link.

10. A face driver according to claim 8, wherein one of said pressure plate has circular recesses machined therein, each carrying one of said inserts facing said driving pins, and a cover plate sealing said recesses and including ball means retained in said recesses.

11. A face driver according to claim 8, wherein said driving pins are each supported by an elastically deformable part of said insert and including an intermediate link between said elastically deformable part and said pins.

12. A face driver according to claim 11, wherein said intermediate link comprises a ball having a ball head formed at its end.

13. A face driver for centering and driving a workpiece to be chucked in a lathe, comprising a support having one end with a dead center adapted to engage against the workpiece and having a plurality of axially extending recesses around the dead center, a driving pin movable in each of the recesses and having first ends adapted to press against the workpiece and opposite second ends, said support having an opposite end with a cylindrical recess, a pressure plate floatably retained within the recess and having one side with engagement portions in engagement with respective second ends of said pins and which are elastically deformable and having an opposite side, and a compression member egaged against the opposite side of said pressure plate urging said plate and said driving pins toward the workpiece, said pressure plate inlcuding a plurality of radially extending arms with respective arms being engaged with respective driving pins and having elastically deformable.

14. A face driver for centering and driving a workpiece to be chucked in a lathe, comprising a support having one end with a dead center adapted to engage against the workpiece and having a plurality of axially extending recesses around the dead center, a driving pin movable in each of the recesses and having first ends adapted to press against the workpiece and opposite second ends, said support having an opposite end with a cylindrical recess, a pressure plate floatably retained within the recess and having one side with portions in engagement with respective second ends of said pins, and which are elastically deformable and having an opposite side, and a compression member engaged against the opposite side of said pressure plate urging said plate and said driving pins toward the workpiece, said pressure plate being provided with elastically deformable segments disposed in two separate planes, one behind the other and mutually staggered.

15. A face driver for centering and driving a workpiece to be chucked in a lathe, comprising a support having one end with a dead center adapted to engage against the workpiece and having at least four axially extending recesses around the dead center, a driving pin movable in each of the recesses and having first ends adapted to press against the workpiece and opposite second ends, said support having an opposite end with a cylindrical recess, a pressure plate floatably retained within the recess and having one side with portions in engagement with respective second ends of said pins and which are elastically deformable, and having an opposite side, and a compression member engaged against the opposite side of said pressure plate urging said plate and said driving pins toward the workpiece, said driving pins being arranged within said support on different diameters and including an equalizing element on said pressure plate supporting said pins and an intermediate link comprising a ball member.

* * * * *